Patented May 19, 1936

2,040,937

UNITED STATES PATENT OFFICE 2,040,937

LAMINATED ARTICLE AND MANUFACTURE OF SAME

John W. Haught, Arlington, N. J., and Ernest Rodman, Marshallton, Del., assignors to Dupont Viscoloid Company, Wilmington, Del., a corporation of Delaware No Drawing. Application July 21, 1934, Serial No. 736,374

16 Claims. (Cl. 49—81)

This invention relates to laminated articles and the manufacture of same and, more particularly, to laminated glass and the interlayer sheet used therein.

The lamination of glass sheets by the interposition of a plastic interlayer sheet, either with or without the use of adhesive, has been practiced for some time in the manufacture of so-called "safety glass" or "non-shatterable glass". Heretofore, the laminated glass produced has been subject to several faults such as imperfect adhesion of the laminations, so that, upon breaking, the glass separates from the plastic interlayer, and poor resistance to the deteriorating action of sunlight and moderate heat.

An object of the present invention is to provide a laminated article in which the laminae adhere perfectly under widely different temperature conditions. A further object is to provide a laminated glass having greatly improved adhesion between its parts and which will not break into pieces under impact even at very low temperatures and which has substantially perfect resistance to the action of sunlight and moderate heat. Other objects of the invention will be apparent from the description given hereinafter.

The above objects are accomplished according to the present invention by uniting two rigid sheets by means of a plastic interlayer sheet of a composition comprising 100 parts of an organic acid ester of cellulose and, as a plasticizer therefor, 66–150 parts of an ester of a polyhydric ether alcohol wherein all of the hydroxyl groups are esterified by a saturated fatty acid containing from 3–5 carbon atoms, inclusive. More particularly the invention comprises uniting two or more sheets of glass by means of plastic interlayer sheets, either with or without the aid of adhesives, of a composition comprising 100 parts of an organic acid ester of cellulose, preferably cellulose acetate, and, as a plasticizer therefor, 66–150 parts, preferably 80–100 parts, of a polyhydric ether alcohol wherein all of the hydroxyl groups are esterified by a saturated fatty acid containing from 3–5 carbon atoms, inclusive. In a preferred embodiment of the invention, the plasticizer comprises a combination of one of the esters recited above and a second plasticizer having a greater solvent action on the organic acid ester of cellulose employed.

The polyhydric ether alcohol esters herein considered for use as plasticizers in the interlayer sheets may be readily prepared by reacting the fatty acid in question with the polyhydric ether alcohol at a sufficiently high temperature to expel the water produced in the reaction as fast as it is formed, or by using a catalyst such as sulphuric acid, and/or a solvent such as toluene or ethylene dichloride, to aid in the removal of water. These esters likewise may be prepared from the sodium salt, or other salts, of the fatty acid and the chloride of the polyhydric ether alcohol, or they may be prepared by an ester interchange. Specific disclosure of the preparation of various esters within this class is given in copending application Serial No. 609,041 of Harold S. Holt, filed May 3, 1932, and in copending application Serial No. 736,346 of Harold S. Holt, filed July 21, 1934.

Among the esters of polyhydric ether alcohols wherein all of the hydroxyl groups are esterified by a saturated fatty acid containing from 3–5 carbon atoms, inclusive, may be enumerated: diethylene glycol dipropionate, diethylene glycol dibutyrate and di-isobutyrate, triethylene glycol dibutyrate and di-isobutyrate, monoethylin di-isovalerate, monoethylin dibutyrate and di-isobutyrate. The saturated fatty acids which may be used for esterifying the polyhydric ether alcohols include propionic acid, n-butyric and isobutyric acids, n-valeric acid, isovaleric acid, and other branch chain 5 carbon acids of this type; propionic and isobutyric acids are particularly useful in giving esters well suited for the purposes of the present invention. The polyhydric ether alcohols to be esterified in making these esters include diethylene glycol, the mono-, poly-aryl or alkyl ethers of glycerol, pentaerythritol, sorbitol and trimethylol propane; polyglycols generally such as triethylene glycol, dipropylene glycol, dibutylene glycol, and the like, and also polyglycerols generally.

It is to be understood that the esters herein referred to are of the type wherein the particular alcohol selected has each of its hydroxyl groups esterified by a saturated fatty acid containing from 3–5 carbon atoms, inclusive. Usually all of the hydroxyl groups will be esterified with the same fatty acid since the preparation of this type of ester is more readily carried out but different esters within the group specified may be employed to esterify the hydroxyl groups, if desired.

The esters mentioned above are all light colored or water white liquids of relatively high boiling points and low vapor pressures such that they fall within the category of plasticizers rather than high boiling solvents. A characteristic of this class of compounds is that they are compatible with the organic acid esters of cellulose and, furthermore, are readily soluble in the organic solvents customarily used in formulating plastic compositions.

The following examples are given to illustrate specific embodiments of the present invention. Throughout the specification and in the claims parts are given by weight:—

*Example 1.*—The following formula was employed:

| | Parts |
|---|---|
| Cellulose acetate | 100 |
| Diethylene glycol dipropionate | 76 |
| Denatured alcohol | 60 |
| C. P. acetone | 20 |

The ingredients were colloided in a Werner-Pfleiderer mixer, filtered by hydraulic pressure through heavy muslin, rolled to remove excess solvent, consolidated by heat and pressure and from the resulting block sheets of approximately 0.025″ caliper were sliced. These sheets were seasoned, i. e., treated substantially to remove volatiles but no substantial part of the plasticizer. The sheet was laid between two clean glass plates and subjected to a pressure of 200 pounds per square inch at a temperature of about 145° C.

*Example 2.*—The procedure was the same as in Example 1 but the following formula was used:—

| | Parts |
|---|---|
| Cellulose acetate | 100 |
| Diethylene glycol dipropionate | 60 |
| Dimethyl phthalate | 35 |
| Denatured alcohol | 20 |
| Ethyl acetate | 24 |
| C. P. acetone | 20 |

*Example 3.*—The following formula was used:

| | Parts |
|---|---|
| Cellulose acetate | 100 |
| Diethylene glycol di-isobutyrate | 86 |
| Denatured alcohol | 64 |
| C. P. acetone | 20 |

The ingredients were colloided and filtered and the resulting colloid extruded by suitable means in the form of a wide ribbon through an orifice. The balance of the procedure was carried out as in Example 1.

*Example 4.*—The procedure in Example 1 was used on a plastic composition made according to the following formula:—

| | Parts |
|---|---|
| Cellulose acetate | 100 |
| Diethylene glycol di-isobutyrate | 60 |
| Dimethyl phthalate | 35 |
| Denatured alcohol | 20 |
| Ethyl acetate | 20 |
| C. P. acetone | 24 |

*Example 5.*—The procedure used was the same as in Example 3 but the plastic sheeting was made from a composition according to the following formula:—

| | Parts |
|---|---|
| Cellulose acetate | 100 |
| Diethylene glycol di-isobutyrate | 45 |
| Dimethyl phthalate | 45 |
| Denatured alcohol | 60 |
| C. P. acetone | 20 |

*Example 6.*—The procedure used was the same as in Example 1 but the plastic sheeting was made from a composition according to the following formula:—

| | Parts |
|---|---|
| Cellulose acetate | 100 |
| Diethylene glycol di-isobutyrate | 41 |
| Dimethoxyethyl adipate | 25 |
| Ethyl acetate | 24 |
| Acetone | 20 |
| Alcohol | 20 |

*Example 7.*—The procedure used was the same as in Example 1 but the plastic sheeting was made from a composition according to the following formula:—

| | Parts |
|---|---|
| Cellulose acetate | 100 |
| Dimethyl phthalate | 45 |
| Diethylene glycol di-isobutyrate | 80 |
| Acetone | 50 |
| Alcohol | 30 |

*Example 8.*—The procedure used was the same as in Example 1 but the plastic sheeting was made from a composition according to the following formula:—

| | Parts |
|---|---|
| Cellulose acetate | 100 |
| Diglyceryl tetracetate | 45 |
| Diethylene glycol di-isobutyrate | 35 |
| Acetone | 50 |
| Alcohol | 30 |

*Example 9.*—The procedure used was the same as in Example 1 but the plastic sheeting was made from a composition according to the following formula:—

| | Parts |
|---|---|
| Cellulose acetate | 100 |
| Diethylene glycol di-isobutyrate | 25 |
| Diethylene glycol dipropionate | 55 |
| Acetone | 20 |
| Ethyl acetate | 24 |
| Alcohol | 20 |

*Example 10.*—The procedure used was the same as in Example 1 but the plastic sheeting was made from a composition according to the following formula:—

| | Parts |
|---|---|
| Cellulose acetopropionate | 100 |
| Diethylene glycol di-isobutyrate | 80 |
| Acetone | 40 |
| Star solvent | 20 |

It should be understood that the above examples are merely illustrative of the invention which broadly relates to lamination of two or more rigid sheets of any material by means of a plastic interlayer sheet of a composition comprising 100 parts of an organic acid ester of cellulose and, as a plasticizer therefor, 66–150 parts of an ester of a polyhydric ether alcohol wherein all of the hydroxyl groups are esterified by a saturated fatty acid containing from 3–5 carbon atoms, inclusive. Obviously, the particular polyhydric ether alcohol ester selected may be replaced in part by any of these esters and, where the claims recite a certain proportion of an ester from this class, it is intended that they shall be construed as calling for a composition containing the said proportion of a single specific ester of the class or two or more of the specific esters aggregating a proportion within the range recited. It is also within the scope of this invention to replace the polyhydric ether alcohol ester in part with a second plasticizer, as explained in detail below.

In the manufacture of the plastic interlayer sheet, any of the usual methods may be employed. The volatile solvents, of course, may be varied widely both as to kind and amounts as will be understood by those skilled in the art. Likewise, high boiling, volatile solvents may also be used such as methyl ether of ethylene glycol, dioxan, ethyl lactate, and the like. In the formulation of the plastic composition and seasoning of the plastic interlayer sheets, consideration must be given to the amount of plasticizer, if any, that will be lost in processing and due allowance made for same. Where the plasticizer is substantially non-volatile, the loss of plasticizer will be negligible and, consequently, the exact amount desired in the finished sheet may be used in the starting formula.

In the lamination process, variations in methods may be employed as are known in the art; for example, either the autoclave or platen type press may be used and also various adhesives such as solvents, dopes, resins, and the like, may be used. The temperature of lamination should preferably not be below 140° C. and as a practical range should be between 135° C. and 170° C. Under special circumstances these limits may be exceeded but, as a general rule, it is not feasible to operate at higher or lower temperatures than the stated range. Lamination pressure need not be high, 100 pounds per square inch is satisfactory but higher pressures may be used provided means are employed to prevent the plastic from flowing out from between the glass.

The examples are all directed to interlayer sheets having a cellulose acetate base and this organic acid ester of cellulose is preferably employed, usually having an acetic number between 50 and 54, although up to 56 is practicable. However, other organic acid esters of cellulose may be used, such as cellulose propionate, butyrate, isobutyrate, and the mixed esters as cellulose acetopropionate and acetobutyrate.

Although the total amount of plasticizer to cellulose ester can be varied over a considerable range, it is important that it be kept within the proportion of 66–150 parts total plasticizer content per 100 parts of the cellulose ester to get the improved laminated glass of the present invention. Below 66 parts total plasticizer content the laminated glass will not satisfactorily bear the force of an impact without breaking into pieces. The preferred range is 80–100 parts total plasticizer content and, within this range, the plastic sheet has a fairly soft, rubbery consistency but still possesses considerable resistance to stretching and deformation. Above 100 parts of plasticizer the plastic sheet becomes extremely rubbery and can be easily stretched. Interlayer sheets containing 120 parts plasticizer will produce a non-shatterable glass which, when cracked by an impact, has considerable flexibility but the glass does not break into pieces and still remains adhering to the plastic. Even higher than 120 parts plasticizer may be used but above 150 parts plasticizer, the plasticity of the interlayer sheet is so marked that a certain amount of undesirable cold flow is present.

Although the value of this new type of laminated article, particularly laminated glass, depends to a large extent on the use of a plastic interlayer sheet containing the new combination of ingredients, viz., organic acid esters of cellulose and, as a plasticizer therefor, one or more of the esters hereinbefore disclosed, in some cases the value of these esters is enhanced by using in combination with them other plasticizers having greater active solvent properties. This improves the compatibility and, in general, gives somewhat improved working qualities in the manufacture of the plastic sheets and lamination of the plastic sheets in glass. Substantially any relatively non-volatile plasticizer may be used, although it is advisable to use only those which are stable and do not have a tendency to discolor when acted upon by heat and sunlight. Among those suitable for use with the organic acid esters of cellulose may be mentioned: tripropionin, dimethoxyethyl phthalate, dimethoxyethyl adipate, diglyceryl tetracetate, triacetin, dimethyl phthalate, methyl phthalyl ethyl glycollate, cyclohexyl methyl adipate, ethyl paratoluene sulphonamide.

The amount of active solvent plasticizer that may be used without detracting from the benefit of the polyhydric ether alcohol esters herein described is up to 50 parts per 100 parts of the cellulose ester. Where the total plasticizer content is at the minimum, then obviously less of the modifying plasticizer is advisable. For example, if a total of 66 parts of plasticizer is used, then only up to 30 parts of the modifying plasticizer is advised. It will be noted that in Example 6, 25 parts of the modifying plasticizer was employed.

Mixtures of the polyhydric ether alcohol esters may be desirable, particularly if one has a more active solvent action than one or more of the others used. The same considerations hold here as do in the use of a modifying plasticizer such as dimethyl phthalate. The more active plasticizer improves the working qualities of the resulting plastic sheet, whereas the less active one adds to the toughness of the sheet. In Example 9 the propionate ester is the more active solvent plasticizer but the isobutyrate ester is less volatile and the combination combines to give the advantageous properties of each.

The present invention is particularly directed to the manufacture of a new type of laminated glass, although the invention is equally applicable to the lamination of all types of rigid sheets, among which may be mentioned metal sheets, wooden laminations, and the like.

An advantage of the present invention is that it provides a laminated glass substantially immune to the deteriorating effects of sunlight and heat. A further advantage is that the interlayer sheet is exceptionally tough, particularly at extremely low temperatures, and gives a laminated glass which has a favorable break test at extremely low temperatures. The fact that the esters of polyhydric ether alcohols and the saturated fatty acids herein disclosed will function in combination with organic acid esters of cellulose to give interlayer sheets of such favorable properties is entirely unexpected and quite sharply distinguishes this class of esters from heretofore known plasticizers. The reason for this is that these esters are not active solvent plasticizers for the organic acid esters of cellulose. With ethyl alcohol they will not colloid cellulose acetate in the cold, yet in spite of this, when incorporated in plastic sheets, these esters do not exude and impart remarkable toughness to the interlayer sheets and give great adhesion. For example, laminated glass according to the present invention has unexpectedly superior resistance to breaking into pieces under impact at low temperatures, below 0° C. and especially below —5° C. The explanation of this appears to be that the particular esters here disclosed impart a degree of toughness to the interlayer film which even the more active solvent plasticizers heretofore known do not impart at low temperatures.

Throughout the specification and in the claims, the proportions given for the composition of the interlayer sheet are the proportions in which the ingredients are originally compounded. This is the standard practice in the art and the most practical way of disclosing the invention. During the compounding of the plastic composition, formation of the sheets, and seasoning of the sheets, some plasticizer is lost, the amount largely depending upon the volatility of the specific plasticizer used, the quantity used, and the method of treatment, particularly the seasoning. For example, the higher the proportion of plasticizer and the more extreme the seasoning treatment, the larger will be the amount of plasticizer lost. A greater amount of an ester of propionic acid will be lost than of an ester of butyric acid. However, in all cases the amount will be relatively small, rarely exceeding 10% of the amount employed. It will therefore be seen that, upon analysis of an interlayer sheet which has been laminated, the proportion of plasticizer will be below that originally compounded with the cellulose ester.

As many apparently widely different embodiments of this invention may be made without departing from the spirit and scope thereof, it is to be understood that the invention is not limited to the specific embodiments thereof except as defined in the appended claims.

We claim:

1. A laminated article comprising two rigid sheets united by a plastic interlayer sheet of a composition comprising 100 parts of an organic acid ester of cellulose and, as a plasticizer therefor, 66–150 parts of an ester of a poly-glycol wherein both of the hydroxyl groups are esterified by a saturated fatty acid containing from 3–5 carbon atoms, inclusive.

2. Laminated glass comprising two sheets of glass united by a plastic interlayer sheet of a composition comprising 100 parts of an organic acid ester of cellulose and, as a plasticizer therefor, 66–150 parts of an ester of a poly-glycol wherein both of the hydroxyl groups are esterified by a saturated fatty acid containing from 3–5 carbon atoms, inclusive.

3. Laminated glass comprising two sheets of glass united by a plastic interlayer sheet of a composition comprising 100 parts of an organic acid ester of cellulose and, as a plasticizer therefor, 80–100 parts of an ester of a poly-glycol wherein both of the hydroxyl groups are esterified by a saturated fatty acid containing from 3–5 carbon atoms, inclusive.

4. Laminated glass comprising two sheets of glass united by a plastic interlayer sheet of a composition comprising 100 parts of cellulose acetate and, as a plasticizer therefor, 66–150 parts of an ester of a poly-glycol wherein both of the hydroxyl groups are esterified by a saturated fatty acid containing from 3–5 carbon atoms, inclusive.

5. Laminated glass comprising two sheets of glass united by a plastic interlayer sheet of a composition comprising 100 parts of cellulose acetate and, as a plasticizer therefor, 80–100 parts of an ester of a poly-glycol wherein both of the hydroxyl groups are esterified by a saturated fatty acid containing from 3–5 carbon atoms, inclusive.

6. Laminated glass comprising two sheets of glass united by a plastic interlayer sheet of a composition comprising 100 parts of an organic acid ester of cellulose and, as a plasticizer therefor, 66–150 parts of a combination of an ester of a poly-glycol wherein both of the hydroxyl groups are esterified by a saturated fatty acid containing from 3–5 carbon atoms, inclusive, and a second plasticizer having a greater solvent action on the organic acid ester of cellulose.

7. Laminated glass comprising two sheets of glass united by a plastic interlayer sheet of a composition comprising 100 parts of an organic acid ester of cellulose and, as a plasticizer therefor, 80–100 parts of a combination of an ester of a poly-glycol wherein both of the hydroxyl groups are esterified by a saturated fatty acid containing from 3–5 carbon atoms, inclusive, and a second plasticizer having a greater solvent action on the organic acid ester of cellulose.

8. Laminated glass comprising two sheets of glass united by a plastic interlayer sheet of a composition comprising 100 parts of cellulose acetate and, as a plasticizer therefor, 66–150 parts of a combination of an ester of a poly-glycol wherein both of the hydroxyl groups are esterified by a saturated fatty acid containing from 3–5 carbon atoms, inclusive, and a second plasticizer having a greater solvent action on the cellulose acetate.

9. Laminated glass comprising two sheets of glass united by a plastic interlayer sheet of a composition comprising 100 parts of cellulose acetate and, as a plasticizer therefor, 80–100 parts of a combination of an ester of a poly-glycol wherein both of the hydroxyl groups are esterified by a saturated fatty acid containing from 3–5 carbon atoms, inclusive, and a second plasticizer having a greater solvent action on the cellulose acetate.

10. Laminated glass comprising two sheets of glass united by a plastic interlayer sheet of a composition comprising 100 parts of cellulose acetate and, as a plasticizer therefor, 66–150 parts of an ester of a polyethylene glycol wherein both of the hydroxyl groups are esterified by a saturated fatty acid from the group consisting of propionic and isobutyric acids.

11. Laminated glass comprising two sheets of glass united by a plastic interlayer sheet of a composition comprising 100 parts of cellulose acetate and, as a plasticizer therefor, 80–100 parts of an ester of a polyethylene glycol wherein both of the hydroxyl groups are esterified by a saturated fatty acid from the group consisting of propionic and isobutyric acids.

12. Laminated glass comprising two sheets of glass united by a plastic interlayer sheet of a composition comprising 100 parts of cellulose acetate and, as a plasticizer therefor, 66–150 parts of an ester from the group consisting of diethylene glycol di-isobutyrate and diethylene glycol di-propionate.

13. Laminated glass comprising two sheets of glass united by a plastic interlayer sheet of a composition comprising 100 parts of cellulose acetate and, as a plasticizer therefor, 66–150 parts of a combination of an ester from the group consisting of diethylene glycol di-isobutyrate and diethylene glycol dipropionate, and dimethyl phthalate.

14. Laminated glass comprising two sheets of glass united by a plastic interlayer sheet of a composition comprising 100 parts of cellulose acetate and, as a plasticizer therefor, 80–100 parts of a combination of an ester from the group consisting of diethylene glycol di-isobutyrate and diethylene glycol dipropionate, and dimethyl phthalate.

15. Laminated glass comprising two sheets of glass united by a plastic interlayer sheet of a composition comprising 100 parts of cellulose acetate and, as a plasticizer therefor, 66–150 parts of a combination of an ester of a polyethylene glycol wherein both of the hydroxyl groups are esterified by a saturated fatty acid from the group consisting of propionic and isobutyric acids, and a second plasticizer having a greater solvent action on the cellulose acetate.

16. Laminated glass comprising two sheets of glass united by a plastic interlayer sheet of a composition comprising 100 parts of cellulose acetate and, as a plasticizer therefor, 80–100 parts of a combination of an ester of a polyethylene glycol wherein both of the hydroxyl groups are esterified by a saturated fatty acid from the group consisting of propionic and isobutyric acids, and a second plasticizer having a greater solvent action on the cellulose acetate.

JOHN W. HAUGHT.
ERNEST RODMAN.